United States Patent Office 3,507,848
Patented Apr. 21, 1970

3,507,848
VULCANIZABLE COMPOSITION CONTAINING
AMINE METAL SALT COMPLEX
Douglas Cameron Edwards, Sarnia, Ontario, and Peter Noel Lewis, Calgary, Alberta, Canada, assignors to Polymer Corporation Limited, Sarnia, Ontario, Canada, a body corporate and politic
No Drawing. Filed Nov. 27, 1967, Ser. No. 685,955
Claims priority, application Canada, Nov. 28, 1966, 976,540
Int. Cl. C08d 5/02; C08f 27/08
U.S. Cl. 260—94.7
10 Claims

ABSTRACT OF THE DISCLOSURE

A heat curable sealant composition having a pot life of at least 30 minutes is provided by a mixture of (a) an olefinically unsaturated liquid polymer containing molecules of a polymerized $C_4$–$C_8$ diolefinic compound, a major proportion of said molecules containing two separated

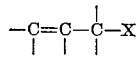

structures where X is a halogen atom such as Cl, Br or I, and (b) an amine-metal salt complex. The preferred liquid polymer is a polymer of butadiene and the complex is represented by a reaction product of an amine containing at least two nitrogen atoms such as methylated triethylene tetramine with a metal salt of Cu, Zn, Mg, Co or Ni. The proportion of the amine-metal salt complex in the mixture is about 0.5–15 parts by weight of amine in said complex per 100 parts by weight of liquid polymer.

---

This invention relates to terminally-active liquid polymers of diolefinic hydrocarbon monomers and particularly to vulcanizates of these polymers.

In this specification, "liquid" polymers are defined broadly as pourable polymers, such polymers generally have intrinsic viscosities of about 0.04–1.0 dl./g. in toluene at 30° C., and "vulcanizates" are the solid reaction products of the liquid polymer with compounds which are capable of linking molecules of the liquid polymers.

Previously, liquid polymers of $C_4$–$C_8$ diolefins, containing allylic halogen groups have been mixed with multifunctional amines and vulcanized therewith. However, in some cases such mixtures have the disadvantage of a short "pot life"; that is, they rapidly thicken to an unworkable condition, which limits their use in certain applicataions such as sealants. Methods of controlling the "pot life" and hence the vulcanization rate of such mixtures are therefore highly desirable and advantageous to the practical applicability of such polymers.

It has now been found that a more attractive sealant composition is provided by a mixture comprised of (a) a major amount of an olefinically unsaturated liquid polymer containing molecules of a polymerized $C_4$–$C_8$ diolefinic compound, a major proportion of said molecules being characterized by the presence of two separated

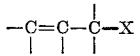

structures within their molecular structures, where X is a halogen atom selected from the group consisting of bromine, chlorine and iodine, and (b) a minor amount of an amine-metal salt complex.

One liquid polymer that can be used in this invention is fully described, along with its process of manufacture, in French Patent 1,488,811. In brief, it can be described as a $C_4$–$C_8$ diolefin polymer, containing two separated, preferably terminal, allylic halogen groups within its structure, and having an intrinsic viscosity of 0.04–1.0, and preferably 0.05–0.6 dl./g., when measured in toluene at 30° C. More than one diolefinic hydrocarbon compound may be employed to form the diolefinic portion of the liquid polymers and when the polymer is a copolymer of a diolefin and a mono-olefin, more than one mono-olefinic monomer may be used to form the non-diolefinic portion of the polymer. The $C_4$–$C_8$ diolefins which may be employed include conjugated diolefins such as butadiene-1,3; 2-methylbutadiene-1,3; pentadiene-1,3; hexadiene-1,3; 2,3-hexadiene-1,3; 2-chloro-butadiene-1,3 and 2,3-dimethyl butadiene-1,3 with butadiene-1,3 being preferred. The mono-olefinic monomers include compounds such as styrene, acrylonitrile and methyl methacrylate. Of the various liquid homo-polymers and copolymers which may be used in this invention, those containing a major proportion of polymerized butadiene-1,3 are preferred. The allylic halogen group may be represented by the formula

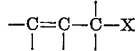

where X is chlorine, bromine or iodine. Broadly, the halogen content of the unvulcanized polymers falls within the range of 1 to 15 weight percent of the total weight of the polymer composition and preferably within the range of 1.5 to 10 weight percent.

Liquid polymers suitable for use in this invention may also be prepared by processes other than the direct polymerization process described in French Patent 1,488,811. For example, they may be produced by oxidative halogenation of liquid diolefin polymers or degradative halogenation or hydrohalogenation of solid polymers of diolefin. They may be also produced from terminally active liquid polymers of conjugated diolefins by chemical modification of their reactive ends.

The amine-metal salt complex component of the present invention is formed by the reaction of a multifunctional amine with a metal salt and contains a chemically-bound multifunctional amine. Examples of suitable multifunctional amines include hexamethylene diamine, diethylene triamine, triethylene tetramine, tetraethylene pentamine, N-amino-ethyl piperidine, etc. and their partially or completely alkylated derivatives such as the N-methylated and N-ethylated derivatives. Amines having a functionality of four or more are particularly suitable since they can tie up a moderate amount of vulcanization-interfering monofunctional polymer chains that may be present in the liquid polymer and still allow for chain extension of the difunctional polymer to obtain satisfactory physical properties. Examples of suitable metals, the salts of which form complexes with amines, include copper, zinc, manganese, cobalt, nickel, etc. Best results are obtained with complexes of cobalt salts. It is believed that the complexes act as reservoirs of amines which are slowly released in the free form and consumed in reaction with the allylic halogen groups of the liquid polymer. This belief is supported by the fact that zinc salt amine complexes, which are known to be remarkably stable, impart a considerably slower rate of vulcanization than do cobalt salt amine complexes. Examples of suitable amine-metal salt complexes which increase the pot life and decrease the vulcanization rate of the liquid polymers, include $CuCl_2 \cdot MTETA$, $ZnBr_2 \cdot MHMDA$, $MnCl_2 \cdot DETA$ $(MnCl_2)_4 \cdot DETA$, $CoCl_2 6H_2O \cdot MTETA$, $CoCl_3 \cdot TEPA$, $NiSO_4 \cdot HMDA$, where MTETA is methylated triethylene tetramine, MHMDA is methylated hexamethylene diamine, DETA is diethylene triamine, TEPA is tetraethylene pentamine, and HMDA is hexamethylene diamine. Pot life may be defined as the time in which the viscosity of the liquid polymer composition, at room temperature, thickens to an unworkable condition. Obviously, the maximum workable viscosity of the composition will depend upon its application. However, for the purposes of this specification, pot life is defined as the time in which the viscosity of the liquid polymer composition, at room temperature, increases to a value of about 50,000 poise. The liquid polymer composition should have a pot life of at least 30 minutes and a pot life of at least 60 minutes is preferred.

The amount of amine-metal salt complex used in the mixture is minor to the amount of liquid polymer and is in the range of about 0.5–15 parts by weight of amine as amine-metal salt complex per 100 parts by weight of polymer and preferably in the range of about 1–10 parts by weight.

The rate of vulcanization of the liquid polymer of this invention will vary dependent on the temperature, the amount and type of complex employed and the activity of the polymer.

Compounding ingredients, such as fillers, colouring pigments, tackifiers and plasticizers also may be incorporated into the compositions of this invention. Examples of fillers include carbon blacks, powdered metals, silicas, clays, calcium carbonate, metal oxides, etc. The plasticizer used must be compatible with the liquid polymer. Suitable plasticizers include paraffinic and naphthenic oils, esters, chlorinated polyphenyls, etc. Thixotropic properties can be imparted to the liquid polymer compositions, when desired, by the addition of materials such as polyethylene, polypropylene, ethylene-propylene copolymers containing more than about 80 mole percent ethylene, ethylene-vinyl acetate copolymer, trans-1,4 polyisoprene and trans-1,4 polybutadiene.

The following examples will further illustrate the invention. In these examples, all parts are parts by weight.

EXAMPLE I 100 parts of butadiene and 10 parts of tetrabromethane were emulsified in 180 parts of water containing 5 parts of dissolved sodium alkyl aryl sulfonate and 5 parts of dissolved tri-potassium phosphate buffer. After raising the temperature of the system to 140° F., 0.5 part of potassium persulfate was added to initiate the polymerization reaction. A further 1.0 part of potassium persulfate was added, in increments, to the agitated emulsion during the course of the reaction. After 64 hours, 79% of the butadiene was converted to polymer. The polymer was recovered by coagulation with methanol, washing in acetone and drying under vacuum at 200° F. 1.25 parts of methylene-bis (2-nonyl-4-methyl) phenol antioxidant were added prior to the vacuum drying step. The dried polymer was a water-white viscous liquid having an intrinsic viscosity in toluene at 30° C. of 0.26 dl./g. and a combined bromine content of 5.5 weight percent.

The $CoCl_2 \cdot 6H_2O \cdot MTETA$ complex was prepared by reacting equimolar amounts of methylated triethylene tetramine and $CoCl_2 \cdot 6H_2O$, the latter being dissolved in methanol. Methanol was removed under vacuum and the purple solid was washed with pentane. A fine dispersion of the complex in the form of a paste was prepared by mixing equal amounts of the complex and vaseline on a paint mill. The paste was stored in a refrigerator until use to prevent decomposition of the complex.

2.31 parts of amine as complex were added to 100 parts of the liquid polymer and 25 parts of naphthenic oil. The vulcanization rate of the system at room temperature (28° C.) was measured by determining the change in viscosity with time using a Brookfield RVT viscometer with a TF spindle. The vulcanization rate of the system at 100° C. was measured by determining the change in insolubility and swelling index with time. The results are presented in Table I and are compared with those for the uncomplexed amine control compound.

TABLE I

| Vulcanizing Agent | $CoCl_2 \cdot 6H_2O \cdot$ MTETA | MTETA (Control) |
|---|---|---|
| MTETA Loading (phr.) | 2.31 | 2.25 |
| Viscosity (poise) at 28° C. after— | | |
| (a) 15 minutes | 310 | 1,400 |
| (b) 30 minutes | 395 | 66,500 |
| Insolubility (percent) at 30° C. after curing at 100° C. for— | | |
| (a) 10 minutes | 0 | 81 |
| (b) 40 minutes | 65 | 92 |
| (c) 160 minutes | 90 | 96 |
| Swelling Index at 30° C. after curing at 100° C. for— | | |
| (a) 10 minutes | | 14 |
| (b) 40 minutes | 22 | 8.7 |
| (c) 160 minutes | 13 | 6.8 |

Swelling index is defined as the ratio of weight of swollen polymer, after 48 hours' immersion in excess benzene at 30° C., to weight of dry insoluble polymer. The results show that pot life is increased and the rate of cure decreased when MTETA is used in the form of a complex.

EXAMPLE II

Two compounds were prepared from the liquid polymer of Example I. 100 parts of liquid polymer were mixed on a 3 roll paint mill with 30 parts of low structure high surface area carbon black and 5 parts of basic lead carbonate. 2.5 parts of amine as complex, $CoCl_2 \cdot 6H_2O \cdot MTETA$ prepared by the method of Example I, were added to the first compound; 2.5 parts of uncomplexed MTETA were added to the second compound. The vulcanizate properties of the compounds are reported in Table II.

TABLE II

| Curative | $CoCl_2 \cdot 6H_2O \cdot$ MTETA | MTETA (Control) |
|---|---|---|
| Tensile Strength (p.s.i.) after curing at 122° C. for— | | |
| (a) 10 minutes | 950 | 2,170 |
| (b) 20 minutes | 1,120 | 2,230 |
| (c) 40 minutes | 1,640 | 2,290 |
| Elongation (percent) after curing at 122° C. for— | | |
| (a) 10 minutes | 515 | 530 |
| (b) 20 minutes | 450 | 480 |
| (c) 40 minutes | 440 | 480 |
| 300% Modulus (p.s.i.) after curing at 122° C. for— | | |
| (a) 10 minutes | 480 | 980 |
| (b) 20 minutes | 640 | 1,050 |
| (c) 40 minutes | 1,000 | 1,130 |

The results show that the complexed amine causes the liquid polymer to cure more slowly initially than does the free amine; after 40 minutes cure the two vulcanizing agents impart comparable stress-strain properties. The properties of the above compounds indicate they are suitable for use as sealants.

EXAMPLE III

The procedure of Example I was repeated except that the loading of $CoCl_2 \cdot 6H_2O \cdot MTETA$ was varied. The results are presented in Table III.

TABLE III

| MTETA Loading (phr.) | 1.54 | 1.92 | 2.69 |
|---|---|---|---|
| Viscosity (poise) at 28° C. after— | | | |
| (a) 30 minutes | 380 | 380 | 46 |
| (b) 60 minutes | 565 | 680 | 3,500 |
| (c) 120 minutes | 2,200 | 12,800 | >50,000 |
| Insolubility (percent) at 30° C. after curing at 100° C. for— | | | |
| (a) 20 minutes | 0 | 44 | 68 |
| (b) 80 minutes | 59 | 77 | 96 |
| (c) 160 minutes | 64 | 83 | |
| Swelling Index at 30° C. after curing at 100° C. for— | | | |
| (a) 20 minutes | | 38 | 23 |
| (b) 80 minutes | 22 | 17 | 12 |
| (c) 160 minutes | 22 | 14 | 9 |
| Tensile Strength (p.s.i.) after curing at 100° C. for— | | | |
| (a) 20 minutes | 95 | 120 | 185 |
| (b) 80 minutes | 120 | 145 | 210 |
| (c) 160 minutes | 145 | 147 | 315 |
| Elongation (percent) after curing at 100° C. for— | | | |
| (a) 20 minutes | 600 | 845 | 850 |
| (b) 80 minutes | 370 | 580 | 565 |
| (c) 160 minutes | 755 | 450 | 575 |
| 300% Modulus (p.s.i.) after curing at 100° C. for— | | | |
| (a) 20 minutes | 55 | 55 | 90 |
| (b) 80 minutes | 60 | 80 | 145 |
| (c) 160 minutes | 60 | 100 | 185 |

The results show that the rate and state of cure increases with higher loadings of amine complex.

EXAMPLE IV

Several complexes of methylated triethylene tetramine with metal salts were prepared in the following manner: $CuCl_2$, $CoCl_2$, $CoCl_3$, $MnCl_2$, $NiCl_2$ and $ZnCl_2$, respectively, were dissolved in methanol. A solution of methylated triethylene tetramine in methanol was added to a molar amount of the appropriate metal salt in alcoholic solution. The reaction products were removed and dried at room temperature. With $MnCl_2$, when the amine was added to the salt a pink precipitate was formed, whereas when the salt was added to the amine a brown precipitate was formed.

The amine-metal salt complexes were analyzed. Most of the products were found to be a single molecule of salt combined with a single molecule of amine. However, the empirical formula of the pink manganese product was $(MnCl_2)_4 \cdot MTETA$ and that of the cobalt dichloride complex was $CoCl_2 \cdot 6H_2O \cdot MTETA$.

Each amine-metal salt complex was mixed with the liquid polymer of Example I in an amount such that 2.5 parts of amine were added per 100 parts polymer; the polymer was extended with 25 parts of naphthenic oil. The mixtures were placed in an oven at 100° C. and the vulcanization characteristics were assessed qualitatively. The observations are recorded in Table IV.

TABLE IV

| Amine-Metal Salt Complex | Time at 100° C. (minutes) | State of Vulcanization |
|---|---|---|
| $CuCl_2 \cdot MTETA$ | 5 | Very good. |
| $CoCl_3 \cdot 6H_2O \cdot MTETA$ | 5 | Excellent. |
| $MnCl_2 \cdot MTETA$ | 5 | Good. |
| $CoCl_3 \cdot MTETA$ | 40 | Fairly good. |
| $NiCl_2 \cdot METEA$ | 40 | Good. |
| $ZnCl_2 \cdot MTETA$ | 40 | Fair. |
| $(MnCl_2)_4 \cdot MTETA$ | 360 | Good. |

The above results indicate that the liquid brominated polymer may be vulcanized with various amine-metal salt complexes.

What is claimed is:

1. A vulcanizable composition comprising a mixture of 100 parts by weight of an olefinically unsaturated liquid polymer containing molecules of a polymerized $C_4$–$C_8$ diolefinic hydrocarbon a major proportion of said molecules having two terminal allylic bromide groups, and 0.5 to 15 parts by weight of an amine-metal salt complex formed by the reaction of a multifunctional amine with a metal salt.

2. The composition of claim 1 in which said liquid polymer is a polymer of butadiene-1,3.

3. The composition of claim 1 in which the metal salt in the amine-metal salt complex is a salt of copper, zinc, manganese, cobalt or nickel.

4. The composition of claim 1 in which the amine in the amine-metal salt complex contains at least two nitrogen atoms.

5. The composition of claim 3 in which the amine-metal salt complex is a reaction product of cobalt dichloride and methylated triethylene tetramine.

6. The composition of claim 1 having a pot life of at least 30 minutes.

7. The composition of claim 4 in which the amine has a functionality of at least four.

8. A process of preparing a vulcanizate which comprises mixing 100 parts by weight of an olefinically unsaturated liquid polymer containing molecules of a polymerized $C_4$–$C_8$ diolefinic hydrocarbon a major proportion of said molecules having two terminal allylic bromide groups and 0.5 to 15 parts by weight of an amine-metal salt complex formed by the reaction of a multi-functional amine with a metal salt, maintaining the mixture in a flowable condition for at least 30 minutes at room temperture and vulcanizing said mixture to a solid substantially insoluble vulcanizate at an elevated temperature of about 100° C. or above.

9. The process according to claim 8 in which the amine-metal salt complex is a reaction product of about equimolar amounts of cobalt salt and methylated triethylene tetramine.

10. The process according to claim 8 in which the amine-metal salt complex is mixed in an amount of about 1–10 parts by weight of amine in said amine complex per 100 parts by weight of polymer.

References Cited

UNITED STATES PATENTS

| 1,463,794 | 8/1923 | Cadwell | 260—795 |
| 1,603,317 | 10/1926 | Carson | 260—795 |
| 1,783,216 | 12/1930 | Bogemann et al. | 260—795 |
| 2,126,620 | 8/1938 | Clifford | 260—798 XR |
| 2,518,573 | 5/1946 | Scott | 260—92.3 |
| 2,647,935 | 8/1953 | Beaver | 260—795 XR |
| 3,397,174 | 8/1968 | Parker et al. | 260—798 XR |

FOREIGN PATENTS

| 1,244,394 | 7/1967 | Germany. |

JOSEPH L. SCHOFER, Primary Examiner

W. F. HAMROCK, Assistant Examiner

U.S. Cl. X.R.

260—41.5, 654, 795, 798, 80.7, 83.3, 85.1, 86.7, 92.3